United States Patent [19]

Fernandez et al.

[11] Patent Number: 5,504,413

[45] Date of Patent: Apr. 2, 1996

[54] BATTERY CHARGING SYSTEM WITH POWER MANAGEMENT OF PLURAL PERIPHERAL DEVICES

[75] Inventors: Jose M. Fernandez; Daniel L. Maierhafer, both of Lawrenceville, Ga.

[73] Assignee: Motorola, Inc., Schaumburg, Ill.

[21] Appl. No.: 506,659

[22] Filed: Jul. 25, 1995

[51] Int. Cl.$^6$ .................. H01M 10/44; H01M 10/46
[52] U.S. Cl. .................. 320/12; 320/43; 379/322; 379/332
[58] Field of Search .................. 320/12, 43, 48, 320/49; 379/59, 58, 63, 322, 332; 340/636, 660

[56] References Cited

U.S. PATENT DOCUMENTS 4,709,202  11/1987  Koenck et al. .................. 320/43
5,254,931  10/1993  Martensson .................. 320/22
5,351,283  9/1994  Kunitomo .................. 379/58

*Primary Examiner*—Peter S. Wong
*Assistant Examiner*—Gregory J. Toatley, Jr.
*Attorney, Agent, or Firm*—Scott M. Garrett; Kenneth M. Massaroni

[57] ABSTRACT

A battery charging system (10) includes a charger (12), power supply (14), electrical device (16), external battery (18), and peripheral device (20). The charger (12) provides connections between the various components such that the electrical device (16), which is a portable electronic device, may communicate with the peripheral device (20). The components are kept small by providing the power supply (14) with a feedback input (26). The power supply generates a voltage output (24) which is at a preselected differential above the feedback level, thus minimizing overhead voltage levels and allowing efficient linear regulation in the electrical device (16) for battery recharging.

9 Claims, 1 Drawing Sheet

BATTERY CHARGING SYSTEM WITH POWER MANAGEMENT OF PLURAL PERIPHERAL DEVICES

TECHNICAL FIELD

This invention relates in general to rechargeable battery systems, and particularly to rechargeable battery systems for portable electronic devices.

BACKGROUND

As electronics become increasingly sophisticated, portable, and available, consumer markets are demanding more services from products and associated systems. In particular, battery charging systems have remained at a low technology level for some time, and only recently has attention been focused on such systems. In addition, products are becoming more interconnectable, that is, products are designed to connect to other devices to provide more functionality to a given system. For example, wireless modems are sold for use with portable computers and personal digital assistants (PDAs).

A typical desktop battery charger simply provides one or two battery receiving pockets and charger contacts to mate with battery contacts. The charger includes a power supply, a regulator, and a control circuit which work in conjunction to charge batteries inserted in the charger. In some cases, particularly portable computers, the charger may also act as a power supply for the product. Many such products include an internal charge controller that takes the power from an external power supply or charger and charges an internally mounted battery. The charger does not offer a means by which the device may connect to other devices. Portable computers, by virtue of their size, have ports for connecting with peripheral devices, however, smaller products, such as cellular telephones and PDAs, have very limited space for such connector ports.

One of the more significant advantages afforded by state of the art electronics is the ability to receive, store and generate information in portable electronics. For example, hand held scanners are commonly used to take inventory of shelf stock in grocery stores. These devices read a code number corresponding to the specific product, then the user enters a count of the number of units on the shelf by means of a keypad or similar entry device. This information is later transferred from the electronic device to a central computer system so that an inventory report can be generated.

Therefore there exists a need for providing connectivity between electrical devices while powering the devices and charging batteries for use with the devices.

DETAILED DESCRIPTION OF THE PREFERRED EMBODIMENT

Figure 1:
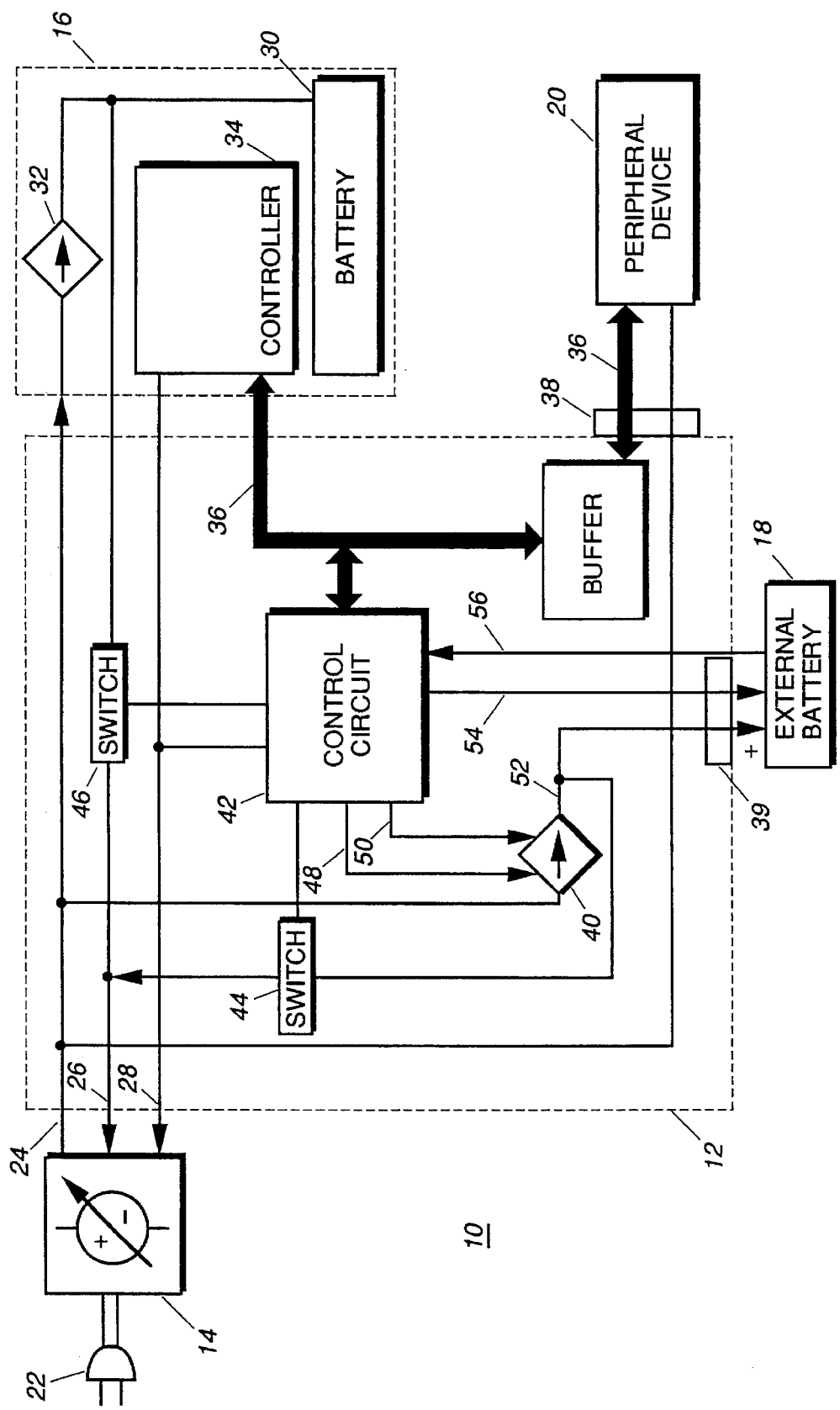
FIG. 1 is a block diagram of a battery charging system in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, which illustrates a block diagram of a battery charging system 10 in accordance with the instant invention, there is shown generally a charger 12 and various system components including power supply 14, electrical device 16, external battery 18, and peripheral device 20. It should be noted that all components shown are referenced to a common voltage potential, and as such, ground connections are not shown for the sake of clarity. It should be assumed, therefore, that each component has a ground potential that is connected to the power supply reference potential through the charger.

The charger 12 is the central part of the system while the other components are electrically interconnected to the charger 12, and may be electrically interconnected to each other through the charger 12. This is accomplished by providing features on the charger for mechanically receiving the various components, and typically a plurality of electrical contacts disposed in the ports to mate with corresponding electrical contacts on the various components. Through these contacts both power and signals may be transmitted between the components. There exist numerous means by which electrical devices may be so interconnected.

The power supply 14 is connected to an AC power source 22, and provides a regulated DC voltage level at output 24. Input 26 receives a feedback voltage level from the other components, as is described hereinbelow, and adjusts the output voltage level at the output 24 to be at a preselected differential above the feedback voltage level. All of the system components are powered by the output voltage of the power supply by regulating the output voltage level. For example, the charger would typically include a 5 volt or a 3.3 volt regulator to power it's internal circuit components. In the present invention, the feedback voltage level is the voltage of a battery being charged by the system. This allows the use of a linear regulator to provide battery charging control because the output voltage level of the charger can be maintained at a minimum level above the saturation voltage of the pass transistor used for linear regulation, and thus considerably reduces the heat generation associated with linear regulators. More specifically, by minimizing the overhead voltage, the power dissipated by the linear regulator is reduced to it's lowest level, making the linear regulator nearly as efficient as a switched mode type. As such, the preferred voltage differential is about 1.4 volts above the feedback voltage level. By significantly reducing heat generation, the linear regulator can be placed in a very small electrical device, such as a cellular telephone, thereby enabling the device to charge a battery inaccessible by the charger, and eliminates the need for charger contacts on the battery.

Accordingly, electrical device 16 comprises a rechargeable internal battery 30, a charging circuit 32, and a controller 34, and a means for electrically interconnecting the electrical device 16 with the charger 12 is provided by the charger 12. The internal battery 30 may be removable for charging separately from the electrical device 16. The output 24 of the power supply is coupled to the device's charge circuit 32 through the charger 12. The charging circuit in turn feeds a regulated current level to the internal battery to recharge the battery. The charge circuit 32 is responsive of the device's controller 34, which determines when to stop charging the battery, and may control the charging circuit 32 such that the charging circuit provides the correct current output level for the particular battery being recharged. The voltage of the battery is fed back to the power supply 14 through the charger 12 to the input of the power supply as the feedback voltage level so that only the minimum voltage necessary is provided by the power supply.

In addition to controlling the internal charge circuit 32, controller 34 is connected to a communication bus 36, such as RS-232, 3-wire, or small computer systems interface (SCSI), for communicating with other system components. A buffer 37 is provided in the charger 12 for latching data during bus communications, as is common in the art. In particular, a peripheral device 20 connected at the peripheral port 38 of the charger 12 may be communicated with. The peripheral port 38 is a means for electrically interconnecting the peripheral device with the charger. Examples of such peripheral devices include personal computers and wireless fax modems. Both control and data information may be transmitted over the bus 36. Several peripheral devices may be connected in parallel to the bus, each with a unique address.

Additionally, the buffer may be used to provide the proper shift of voltage in the communications protocol. Since there is a trend towards lower voltage levels in digital systems, such as from 5 volts to 3.3 volts, it is preferable that the charger be able to communicate with other devices regardless of the digital voltage level. For example, a cellular telephone having a set of telephone numbers may be a 3 volt system. The user wishing to store the phone numbers in a computer would insert the telephone in the charger, and connect the computer, via an appropriate cable, to the peripheral port of the charger. Since the computer is more likely to operate at higher voltage levels, the buffer ensures the proper level shift in both directions between the communicating devices.

To maximize the usefulness of the system 10, it is preferable for the charger 12 to be able to recharge at least one auxiliary or external battery 18. This is accomplished by providing an external battery port for mechanically receiving and electrically interconnecting the charger 12 with the external battery 18. To accomplish charging of the external battery 18, the charger 12 requires a current regulator 40, a control circuit 42, and at least 2 switches 44 and 46. The control circuit 42 preferably includes a microprocessor, such as the MC68HC05B6 manufactured by Motorola Inc., and an EPROM, or other non-volatile storage, for storing instruction sets and allowing for changes in the product once in the hands of the consumer. The current regulator 40 may be either of the linear type or the switched mode type. Both types are well known in the art, and the advantages and disadvantage of each must be weighed by the designer of the system 10 in determining which is more suitable for the particular application. The current regulator is controlled by the control circuit 42 with regard to current regulation level by at least one line 48. This line 48 may be either an on/off type control, or a reference level provided by the control circuit 42. Preferably two lines are used, line 48 for on/off control and line 50 for providing the reference level. The regulator output 52 is fed to the external battery 18, and the voltage subsequently produced is fed back to the power supply input 26 as a feedback voltage level through switch 44.

Switches 44 and 46 are necessary when the system is capable of charging more than one battery, and are preferably transistor switches such as MOSFETs. Since the power supply's output voltage level is determined by the feedback voltage provided by the particular battery being charged, whether it is an internal battery 30 or an external battery 18. As such, only the battery voltage of the particular battery being charged should be fed to the input 26 of the power supply, to the exclusion of any other battery voltage. Accordingly, control circuit 42 monitors the system to determine which battery is being charged and closes the appropriate switch. Either switch 44 or switch 46 is closed and the other is opened. Should the charger 12 be engaged in charging an external battery at the time when an electrical device 16 is first connected to the system, and the internal battery 30 of the device 16 requires charging, the device 16 communicates this to the control circuit 42 by bus 36, or a separate line such as information line 28. The control circuit then switches switch 44 off, and switch 46 on, thereby allowing the device 16 to charge it's internal battery 30. When the device 16 is finished, the device notifies the control circuit by bus 36, and the charger resumes charging the external battery. The external battery 18 preferably provides a temperature indication signal 54 so that the charger 12 can monitor the temperature of the battery 18. Additionally, the battery 18 may provide a data signal 56 to indicate parameters such as capacity of the battery and the chemistry of the battery.

In addition to the input and output provided by the power supply 14, it may additionally provide an information line 28. This line allows the system components to query the power supply 14 to determine, among other parameters, the output capacity, i.e. the power supply's maximum current output level. This information helps the system components decide how to distribute power. For example, if a device is recharging a battery at a current level x, and the device needs to perform some other operation which requires a current level y, and where x+y exceeds the maximum current output level of the power supply, the device would shut off the charging circuit momentarily while performing the other operation. In this way power supplies can be kept small since they won't have to provide all system components with maximum power simultaneously at any given moment. This results in a form of power rationing.

The present invention thus provides a system which allows portable electrical devices to be connected to peripheral devices while charging one or more batteries. It allows the reduction of the number of contacts provided by the batteries since the electrical device itself carries it's own charging control circuitry, thereby eliminating the need for separate charger mating contacts. By allowing communication between the components, a form of power rationing can be implemented, thus allowing the power supply to be smaller than is typically required.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery charging system, comprising:

a power supply having an output and an input, said input for receiving a feedback voltage level, said output providing an output voltage level at a preselected differential above said feedback voltage level;

a charger connected to said power supply for electrically interconnecting with a peripheral device and an electrical device, and having a communication bus disposed between said peripheral and said electrical devices;

said electrical device, having a rechargeable internal battery having a battery voltage level, and a charge circuit; and wherein said electrical device communicates with said peripheral device over said communication bus, said battery voltage level provides said feedback voltage level, said output voltage level of said power supply is fed to said charge circuit, and said charge circuit charges said internal battery.

2. A battery charging system as defined by claim 1, wherein said charger further comprises:

a controller;

an external battery port for receiving and electrically interconnecting said charger with an external battery; and a current regulator, fed by said output voltage level of said power supply and responsive to said controller, for providing a charging current to said external battery.

3. A battery charging system as defined by claim 1, wherein said preselected differential is about 1.4 volts.

4. A battery charging system as defined in claim 1, wherein said electrical device is a cellular telephone.

5. A battery charging system as defined by claim 1, wherein said charger further comprises a buffer on said communication bus between said electrical and said peripheral device.

6. A charger for use in a battery charging system including a power supply, comprising:

means for electrically interconnecting with an electrical device;

means for electrically interconnecting with a peripheral device; and communication bus disposed between said means for electrically interconnecting with said electrical and said peripheral devices.

7. A charger as defined in claim 6, further comprising a means for electrically interconnecting with and charging an external battery.

8. A charger as defined by claim 6, further comprising a buffer on said communication bus between said means for electrically interconnecting with said electrical and said peripheral devices.

9. A charger as defined by claim 6, wherein said electrical device comprises:

a rechargeable internal battery;

a charging circuit; and wherein said electrical device receives power from said power supply through said charger to recharge said rechargeable internal battery.

* * * * *